United States Patent
Takano et al.

(10) Patent No.: US 6,909,545 B2
(45) Date of Patent: Jun. 21, 2005

(54) BINOCULAR VIBRATION CORRECTING DEVICE AND BINOCULAR OPTICAL INSTRUMENT

(75) Inventors: Hironori Takano, Tokyo (JP); Haruhiko Yamanouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 10/022,504

(22) Filed: Dec. 20, 2001

(65) Prior Publication Data

US 2002/0085275 A1 Jul. 4, 2002

(30) Foreign Application Priority Data

Dec. 27, 2000 (JP) ........................................ 2000-399560

(51) Int. Cl.⁷ ............................................. G02B 27/64
(52) U.S. Cl. ........................ 359/557; 359/554; 396/52; 396/55
(58) Field of Search ................................ 359/480, 407, 359/410, 419, 481, 482, 554, 555, 556, 557; 396/52, 53, 54, 55

(56) References Cited

U.S. PATENT DOCUMENTS

| | | | |
|---|---|---|---|
| 3,915,550 A | * 10/1975 | Humphrey | 359/556 |
| 5,672,862 A | 9/1997 | Ohara et al. | 250/204 |
| 5,798,863 A | 8/1998 | Udagawa et al. | 359/557 |
| 5,809,347 A | * 9/1998 | Usui | 396/53 |
| 6,160,959 A | * 12/2000 | Mizumoto | 396/55 |
| 6,173,121 B1 | * 1/2001 | Tomita et al. | 396/52 |
| 6,191,888 B1 | 2/2001 | Yamanouchi | 359/557 |
| 6,343,188 B1 | * 1/2002 | Morofuji | 396/55 |

FOREIGN PATENT DOCUMENTS

| | | |
|---|---|---|
| JP | 2-284113 | 11/1990 |
| JP | 7-84223 | 3/1995 |
| JP | 10-333201 | 12/1998 |

* cited by examiner

Primary Examiner—Drew A. Dunn
Assistant Examiner—Joshua L Pritchett
(74) Attorney, Agent, or Firm—Fitzpatrick, Cella, Harper & Scinto

(57) ABSTRACT

Binocular vibration correcting device comprises left and right vibration-correcting optical systems that correct images by being driven in the yaw and pitch directions in accordance with vibration. Optical system holding members hold the left and right vibration-correcting optical systems. Intermediate supporting member supports the optical system holding members so as to be able to rotate in the yaw direction and is supported by a main body member so as to be able to rotate in the pitch direction. The optical system holding members are connected so as to be able to rotate in the yaw direction at a position distanced in the optical axis direction away from the yaw direction rotational axes of the optical system holding members.

18 Claims, 10 Drawing Sheets

BINOCULAR VIBRATION CORRECTING DEVICE AND BINOCULAR OPTICAL INSTRUMENT

BACKGROUND OF THE INVENTION

1. Field of the Invention

The invention relates to a binocular optical instrument equipped with image vibration correction function.

2. Description of the Related Art

Japanese Laid-Open No. Hei-2-284113 proposed a binocular capable of correcting image vibrations caused by shaking hands during observation. The correction in said invention is accomplished in a prism binocular shown in FIG. 9 of the present application by rotating all or a part of an erecting optical system consisting of a pair of prisms P and group of mirrors M in the yaw and pitch directions relative to the fixed part of the binocular so as to suppress the displacements of the focused image formed by the objective optical system in the yaw and pitch directions.

Japanese Laid-Open No. Hei-7-84223 proposed as shown in FIG. 10 of the present application a system wherein a variable apical angle prism ("VAP") on the side of the object relative to the focal plane of the object optical system contained in the left and right lens barrels 91L and 91R, so that the vibrations of the image can be corrected by suppressing the displacements of the focal image formed by the object optical system in the yaw and pitch directions by changing the reflective and refractive angles of this variable apical angle prism in the yaw and pitch directions.

However, the binocular proposed by Japanese Laid-Open No. Hei-2-284113 has a problem in that it requires an elusive use prism P for adjusting the eyepiece width (spacing between eyepieces), which makes it difficult to present a compact binocular, since a part of the mirror group M is shared by both the left and right sides to correct the vibrations despite the fact that it provides an advantage in that a pair of light beams that have passed through a pair of object optical systems can be simultaneously correction controlled for vibrations.

Also, the above binocular comprises an erecting optical system such as an erecting prism so that it is not applicable to a binocular that does not have an erecting optical system, for example, a Galilean binocular. More over it requires the use of high precision components in order to keep the difference of the left and right optical axes within a certain limit, so that it is difficult to make construction inexpensive.

On the other hand, the binocular proposed by Japanese Laid-Open No. Hei-7-84223 requires an additional optical part (VAP) to be used in order to suppress the displacement of the focal image by bending the optical axis, which causes restrictions in terms of reducing cost and size, in addition to a problem in that it requires a careful optical axis adjustment between the left and right sides as the left and right lens barrels are connected so as to be able to rotate relative to each other by means of a connecting pin RP, which makes the system more cumbersome to deal with.

SUMMARY OF THE INVENTION

From the foregoing situations, the present invention intends to provide a binocular optical instrument capable of maintaining a simple relation between the left and right optical axes in order to avoid otherwise cumbersome adjustment of the left and right optical axes, securely correcting image vibrations, and thus achieving an inexpensive and compact product.

In one aspect according to the present invention, a binocular vibration correcting device is provided which comprises: a left and right pair of vibration-correcting optical systems that correct left and right images by being driven in the yaw and pitch directions in accordance with vibration; a pair of optical system holding members that hold said pair of vibration-correcting optical systems respectively; an intermediate supporting member that supports said left and right optical system holding members so as to be able to rotate in the yaw direction and simultaneously supported by a main body member to be able to rotate in the pitch direction; a connecting member that connects said pair of optical system holding members so as to be able to rotate in the yaw direction at a position distanced in the optical axis direction away from the yaw direction rotational axes of said pair of optical system holding members; a yaw direction drive unit that drives said connecting member in the yaw direction; and a pitch direction drive unit that drives said intermediate supporting member in the pitch direction.

Connecting the pair of optical system holding members that hold the vibration correcting optical system with the connecting member provided at a position distanced in the optical axis direction away from their yaw direction rotational axes makes it possible to correct image vibration by rotating the vibration-correcting optical system in both the yaw and pitch directions while maintaining the positional relation of the optical axis of the vibration-correcting optical system securely. For example, if a parallel link that can operate in the yaw direction is constituted by the intermediate supporting member, the pair of optical system holding members and the connecting member, it is possible to maintain a parallel relation securely between the optical axes of the left and right vibration-correcting optical systems.

Moreover, since the vibration correcting motions of the left and right optical system holding members (i.e., the vibration-correcting optical system) are made possible by means of driving the connecting member in the yaw direction by the yaw direction drive unit and the intermediate supporting member in the pitch direction by the pitch direction drive unit, the vibration correcting mechanism can be constituted more simply, which contributes to making of the binocular optical instrument more compact.

Also, by constituting the left and right vibration-correcting optical systems each with a single or multiple lenses, it is possible to produce them more economically compared to the case of using a VAP.

Further, it is possible to have the yaw direction rotate axis and the pitch direction rotate axis of the intermediate supporting member within a same plane perpendicular to an optical axis (e.g., the optical axis of the objective optical system).

Since an optical system is symmetrical to its optical axis, it is necessary to have the yaw direction rotational axis and the pitch direction rotational axis to be in a same plane. However, since the positions of both rotational axes have some tolerance (in which the optical performances are not much affected), if it is within the tolerance, it is possible to place them in other planes that are parallel to each other. It is also possible to not place them in a same plane in an optical system having an aspect ratio (e.g., camera).

It is also possible to arrange the vibration-correcting optical system on the opposite side of the plane relative to at least one of the yaw direction drive unit and the pitch direction drive unit across the plane in order to achieve a better weight balance.

Further objectives and constructions of the present invention will be clarified in the preferred embodiment to be described in the following.

DETAILED DESCRIPTION OF THE PREFERRED EMBODIMENTS

The details of the embodiment shown in these drawings will be described. FIG. 1 through FIG. 8 show the construction of a binocular (binocular optical instrument) having a binocular vibration correcting device, which is a preferred embodiment of the present invention.

Figure 1:
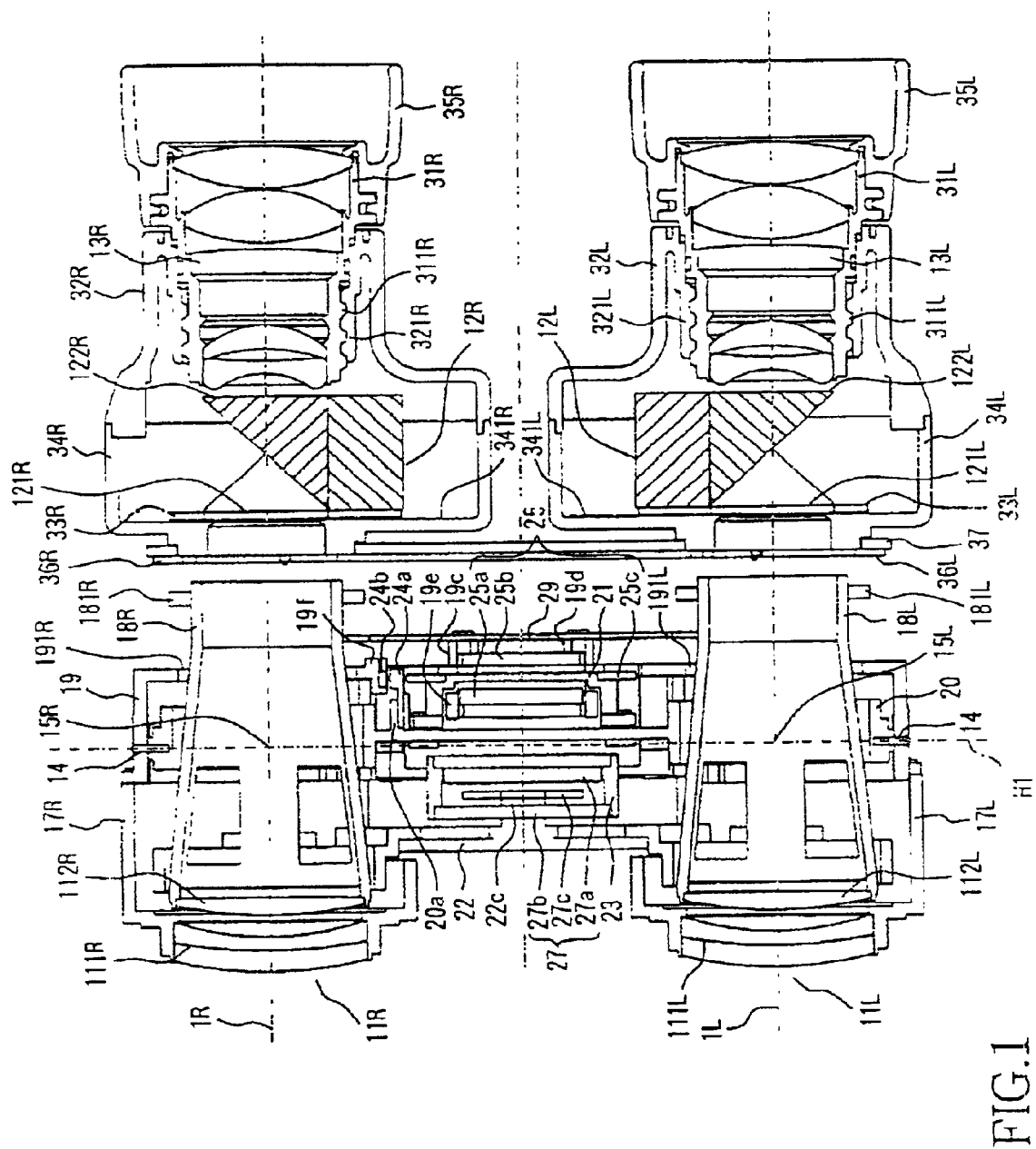
FIG. 1 is a horizontal cross section of a binocular according to a preferred embodiment of the present invention.
Figure 2:
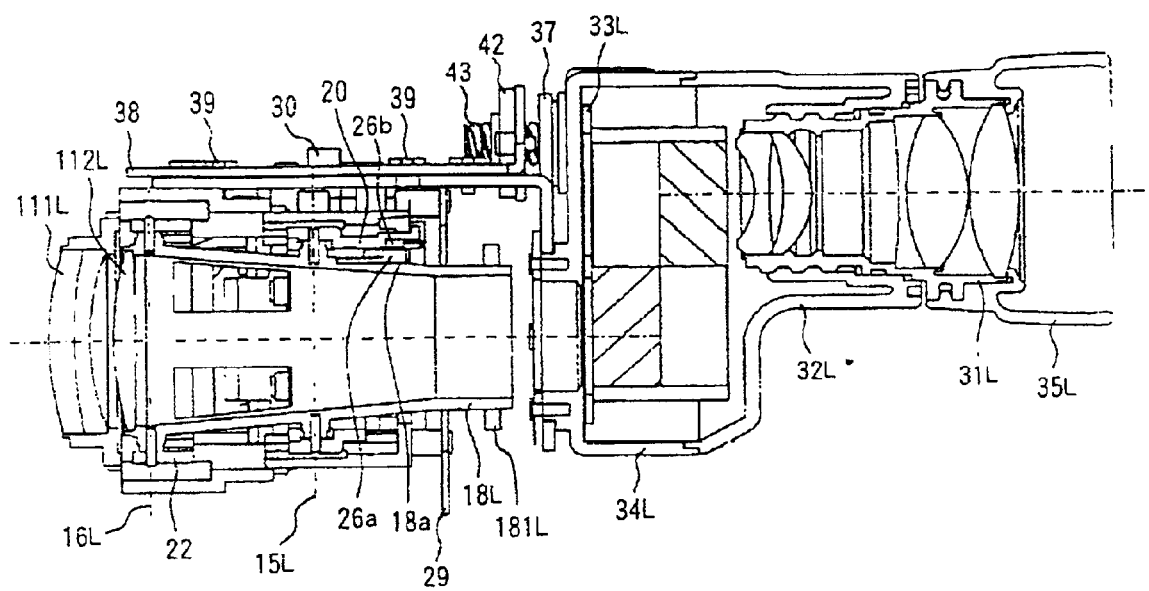
FIG. 2 is a vertical cross section of the binocular.
Figure 3:
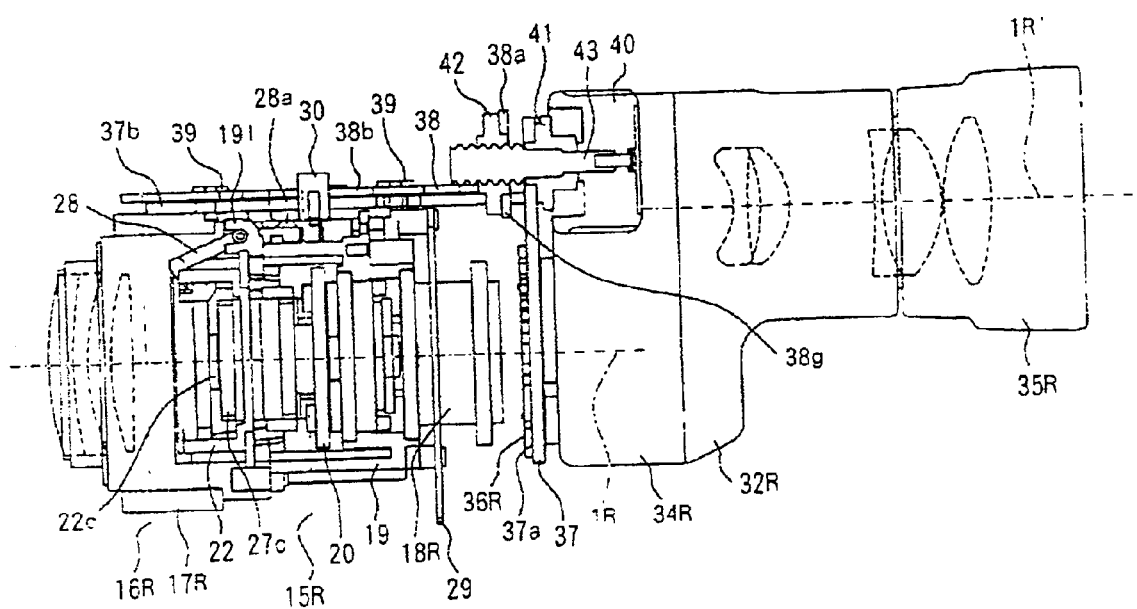
FIG. 3 is a vertical cross section of the binocular.

FIG. 1 is a horizontal cross section of a binocular (binocular optical instrument) according to a preferred embodiment of the present invention cut along a plane including the left and right optical axis; FIG. 2 is a vertical cross section of the binocular cut along a plane including the left optical axis; and FIG. 3 is a vertical cross section of the binocular cut along a plane in the middle in the left and right directions.

Figure 4:
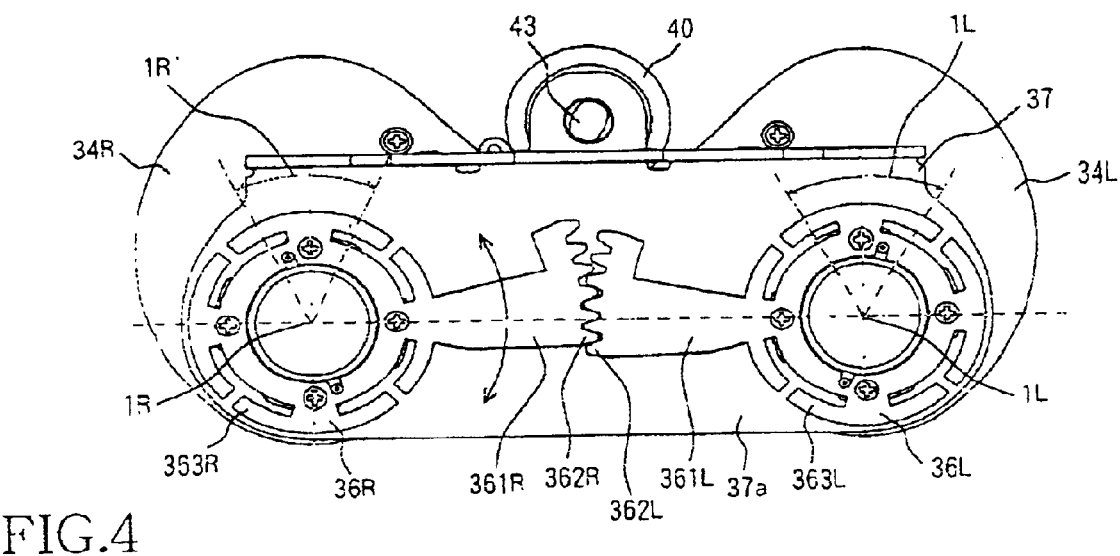
FIG. 4 is a plan view describing the interlocking mechanism of the ocular unit of the binocular.
Figure 5:
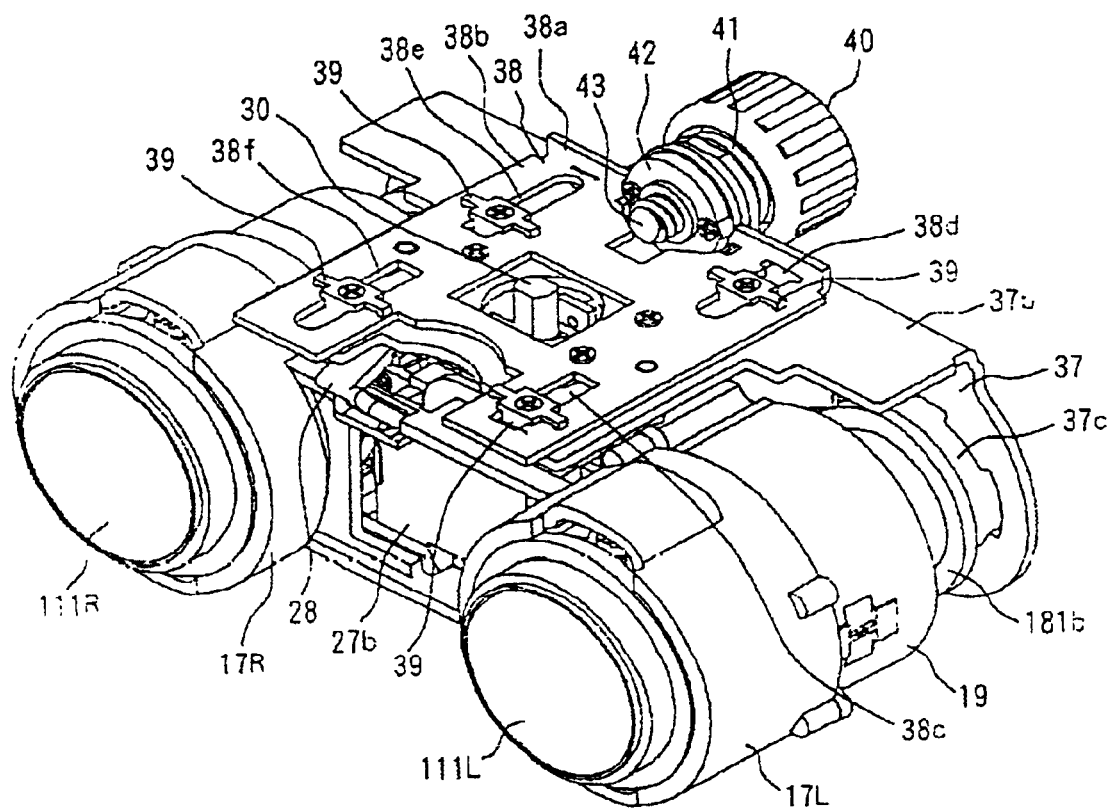
FIG. 5 is a perspective view for describing the focus adjusting mechanism of the binocular.
Figure 6:
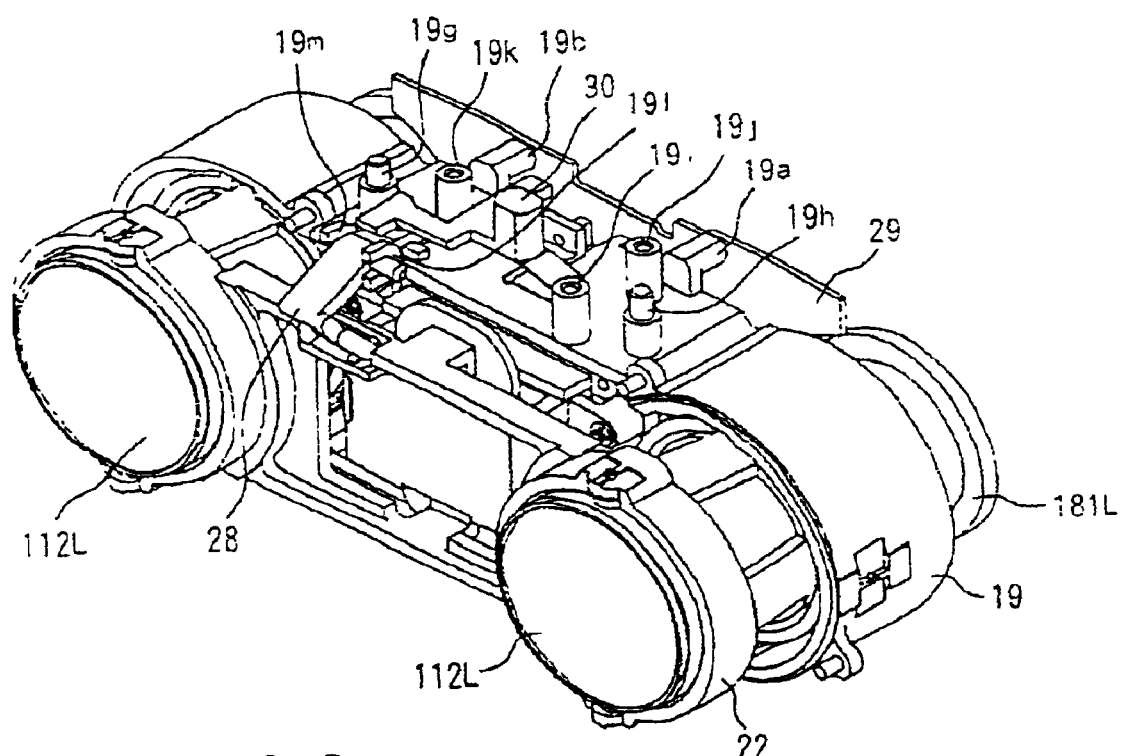
FIG. 6 is a perspective view for describing the construction of the objective optical system of the binocular.
Figure 7:
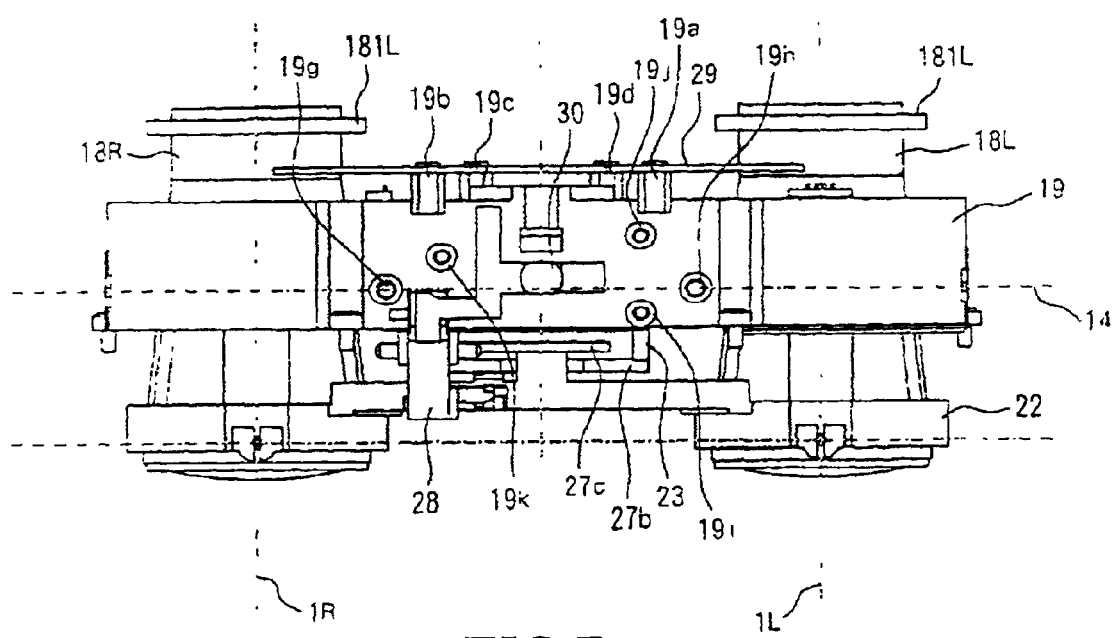
FIG. 7 is a plan view for describing the construction of the objective optical system of the binocular.
Figure 8:
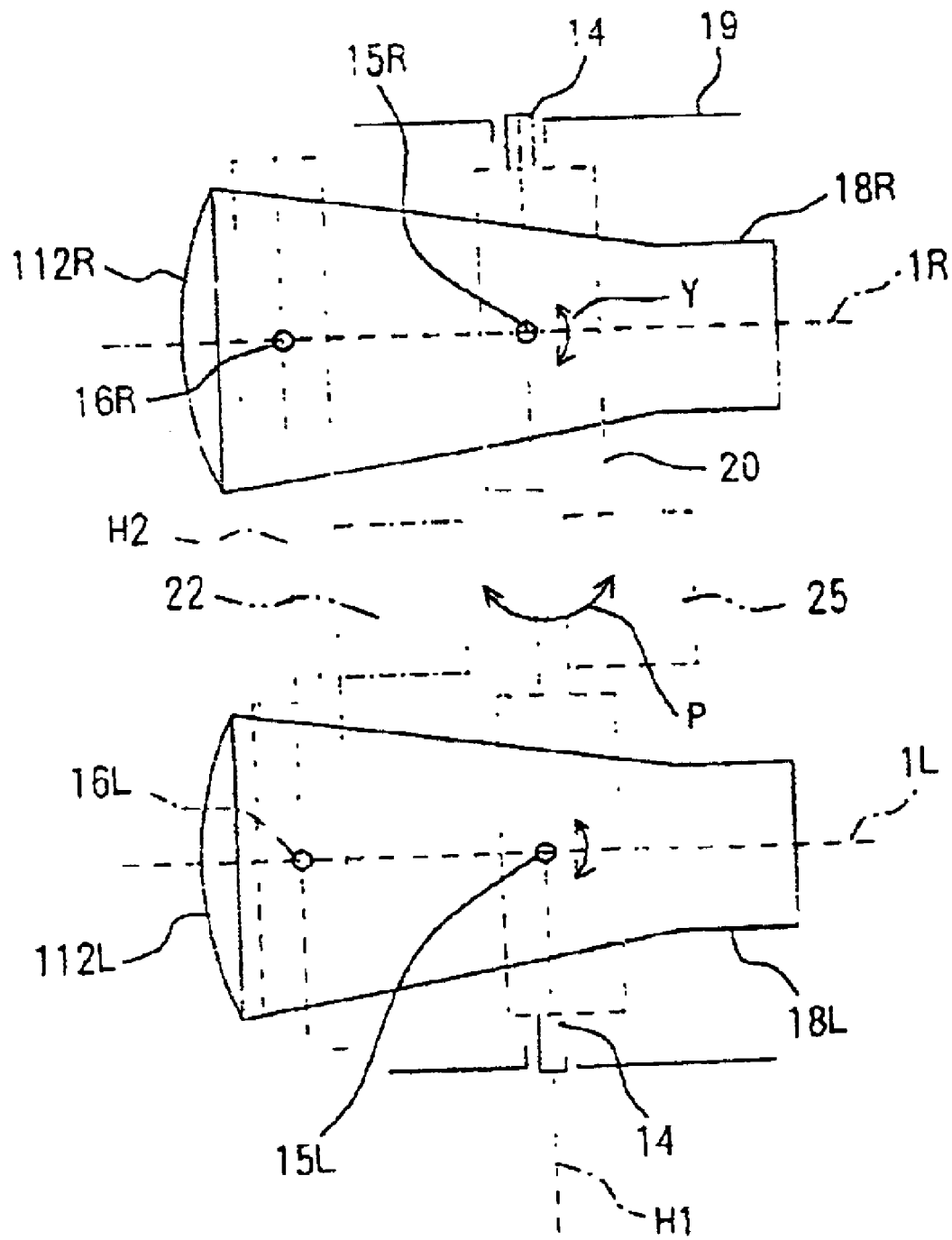
FIG. 8 is a schematic view showing the mechanical construction of the vibration correcting device of the binocular.
Figure 9:
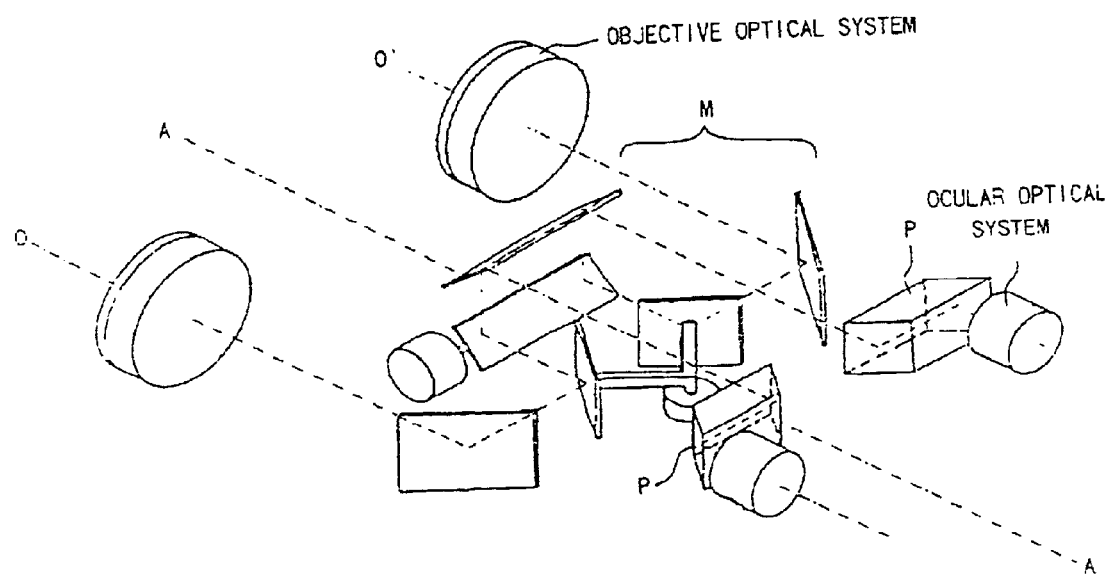
FIG. 9 is a perspective view showing the construction of the vibration correcting device of a conventional binocular.
Figure 10:
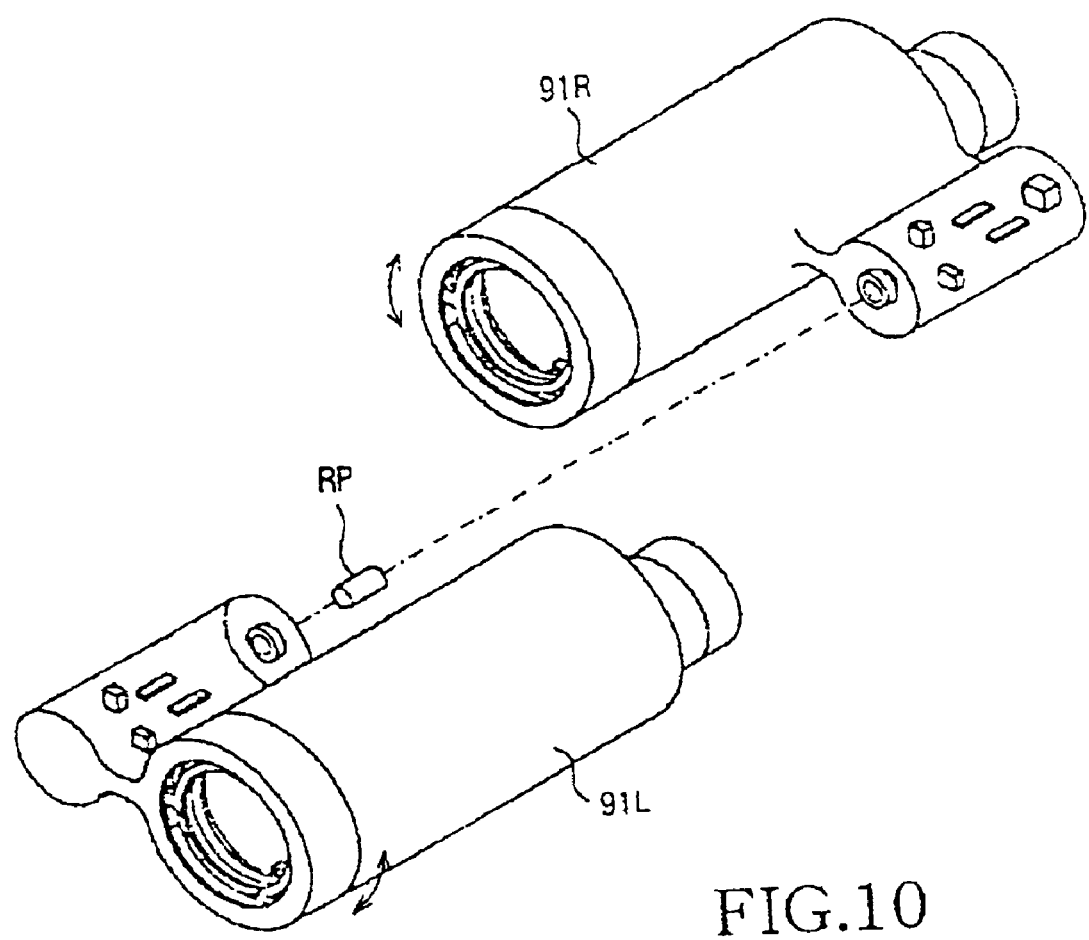
FIG. 10 is a perspective view showing the construction of the vibration correcting device of a conventional binocular.

FIG. 4 shows the interlocking mechanism of the ocular unit of the binocular; FIG. 5 shows the focus adjusting mechanism of the binocular; FIG. 6 and FIG. 7 show the objective optical system of the binocular; and FIG. 8 shows the general construction of the vibration correcting device of the binocular. In these drawings, members that cover the outside of the binocular body are not shown.

First, the general construction of the optical system of the binocular will be described. The optical system of the binocular is comprised of a left and right pair of objective optical systems 11L and 11R, a left and right pair of erecting optical systems ("erecting prisms") 12L and 12R, and a left and right pair of ocular optical systems 13L and 13R.

The left side objective optical system 11L and the left side ocular optical system 13L constitute the left side telescopic optical system. The right side objective optical system 11R and the right side ocular optical system 13R constitute the right side telescopic optical system.

The objective optical systems 11L and 11R have mutually parallel optical axes 1L and 1R. Beams that enter the objective optical systems 11L and 11R enter incident planes 121L and 121R of the erecting prisms 12L and 12R, repeat total reflections inside the erecting prisms 12L and 12R, exit from the exit planes 122L and 122R of the erecting prism 12L and 12R, and enter the ocular optical systems 13L and 13R.

The objective optical systems 11L and 11R consist of front groups 111L and 111R and rear groups 112L and 112R.

The image vibration correction during observation is executed by rotating the rear groups (single or multiple lenses constituting the vibration-correcting optical system) 112L and 112R in a horizontal direction (the arrow Y direction in FIG. 8; "yaw direction") and in a vertical direction (the arrow P direction in FIG. 8; "pitch direction").

Next, the objective optical system and the ocular optical system will be described individually in further detail.

First the constructions of the objective optical systems 11L and 11R will be described. The reference numeral 14 denotes a pitch rotational pivot shaft (pitch direction rotational axis) that perpendicularly intersects the optical axes 1L and 1R and extends in the yaw direction, lying on a first plane (H1 in FIG. 8) that perpendicularly intersects the optical axes 1L and 1R.

The reference numerals 15L and 15R denote the left and right yaw rotational pivot shafts (yaw direction rotational axes) that perpendicularly intersect the optical axes 1L and 1R and extend in the pitch direction, lying on the first plane. In other words, both the pitch rotational pivot shaft 14 and the yaw rotational pivot shafts 15L and 15R are all lying on the first plane.

The reference numerals 16L and 16R denote the left and right connecting rotational pivot shafts extending parallel to the yaw rotational pivot shafts 15L and 15R and are lying on a second plane (H2 in FIG. 8), which is parallel to the first plane, intersects with the optical axes 1L and 1R, and is distanced from the first plane in the forward direction parallel to the optical axes 1L and 1R.

The reference numerals 17L and 17R denote a left and right pair of objective fixed barrels that support the front groups 111L and 111R of the objective optical system 11L and 11R, respectively. These objective fixed barrels 17L and 17R are fixed to the IS main body (main body member) 19 to be described later by means of screws or the like, so that the optical axes 1L and 1R are parallel to each other and separated by a predetermined distance.

The reference numerals 18L and 18R denote a left and right pair of yaw holding frames (optical system holding members) that hold the rear groups 112L and 112R of the objective optical system 11L and 11R, respectively. The yaw rotational pivot shafts 15L and 15R are integrally attached to these yaw holding frames 18L and 18R.

A supporting part 18a is formed on top of the yaw holding frame 18L and on the rear of the yaw rotational pivot shaft 15L to support a permanent magnet 26a that constitutes a yaw direction detector 26 to be described later. The permanent magnet 26a is affixed to the supporting part 18a by glue or the like.

On the rear part of the yaw holding frames 18L and 18R, balancer members 181L and 181R for counterbalancing the weights of the rear groups 112L and 112R relative to the pitch rotational pivot shaft 14 are mounted. The mounting positions of the balancer members 181L and 181R are arbitrarily adjustable in the direction of the optical axes 1L and 1R. i.e., ocular optical systems 13L and 13R, are capable of moving back and forth along the optical axes 1L and 1R, respectively.

The connecting pivot shafts 16L and 16R are integrally attached on the front top and bottom of the yaw holding frames 18L and 18R respectively.

The reference numeral 19 denotes an IS main body that has a fitting hole part, into which the pitch rotational pivot shaft 14 is fitted, allowing itself to rotate. The IS main body 19 is formed in such a way as to open widely on the side of the objective optical systems 11L and 11R and to provide opening parts 191L and 191R, through which the rear parts of the yaw holding frames 18L and 18R pass, on the side of the erecting prisms 13L and 13R. Moreover, mounting seats 19a through 19d are provided on the rear end side for mounting the drive control circuit board 29 to be described later.

A supporting part 19e is formed in the middle of the IS main body 19 to support a permanent magnet 25a and a yoke 25b that constitute the pitch direction drive mechanism (pitch direction drive unit) 25 to be described later. A supporting part 19f is formed on the right side in the middle of the IS main body 19 to support a hole device 24b that constitutes the pitch direction detector 24 to be described later. The hole device 24b is fixed to the supporting part 19f by glue, etc.

As shown in FIG. 6, in the top middle portion of the IS main body 19 are provided positioning pins 19g and 19h for positioning it relative to the focus interlocking plate 38 to be described later and the mounting seats 19i through 19k for mounting the focus interlocking plate 38. On the front of the IS main body 19 are provided supporting parts 19l and 19m for supporting the IS lock member 28 to be described later.

The reference numeral 20 denotes a pitch holding frame (intermediate supporting member), to which the pitch rotating pivot shaft 14 is integrally attached. As mentioned before, the pitch rotational pivot shaft 14 is held in the IS main body 19 to be able to rotate in the pitch direction for a predetermined angle. This makes it possible to rotate the pitch holding frame 20 relative to the IS main body 19 in the pitch direction for a predetermined angle.

A pair of opening parts (reference numeral) are formed on the right and left side of the pitch holding frame 20 the same as in the IS main body 19 for allowing the yaw holding frames 18L and 18R to pass through them up to the middle section. The pitch holding frame 20 holds the yaw rotate pivot shafts 15L and 15R allowing them to rotate in the yaw direction up to predetermined angles. Thus, the yaw holding frames 18L and 18R that hold the rear groups 112L and 112R can rotate in the yaw direction up to the predetermined angles relative to the pitch holding frame 20 and the IS main body 19.

A supporting part 20a is formed in the middle section of the pitch holding frame 20 to support a permanent magnet 24a that constitutes the pitch direction detector 24. The permanent magnet 24a is fixed on the supporting part 20a by glue or the like.

The pitch holding frame 20 has mounting seats 20b through 20e formed for mounting a coil supporting member 21 and the coil supporting member 21 supports a coil 25c that constitutes the pitch direction drive mechanism 25.

The reference numeral 22 denotes a yaw bridge (connecting member) that is mounted on the connecting pivot shafts 16L and 16R so as to be able to rotate in order to hold the yaw holding frames 18L and 18R in such a way that the optical axes of the rear groups 112L and 112R held by the yaw holding frames 18L and 18R match with the optical axes of the front groups 111L and 111R.

The yaw bridge 22 has a pair of opening parts formed the same as in the IS main body 19 and the pitch holding frame 20 to allow the yaw holding frames 18L and 18R to pass through.

The yaw bridge 22 can move only in the direction approximately perpendicular to the optical axes of the rear groups 112L and 112R when the yaw holding frames 18L and 18R rotate around the yaw rotate pivot shafts 15L and 15R. The yaw holding frames 18L and 18R form a so-called parallel link mechanisms together with the pitch holding frame 20. Consequently, the optical axes of the rear groups 112L and 112R maintain an approximately parallel relation.

Moreover, a coil supporting part 22c is formed in about the middle portion of the yaw bridge 22 to support a drive coil 27c that constitutes a yaw direction drive mechanism (yaw direction drive unit) 27 to be described later.

The reference numeral 28 denotes an IS lock member that locks the yaw bridge 22 temporarily to a predetermined position. By locking the yaw bridge 22 to the predetermined position with this IS lock member 28, the optical axes of the rear groups 112L and 112R can be matched with the optical axes of the front groups 111L and 111R.

The reference numeral 30 denotes an IS lock switch. As the observer operates this IS lock switch 30 when using the binocular, a protruding part 28a provided on the IS lock member 28 is pushed down, thus releasing the lock on the yaw bridge 22. In other words, the rear groups 112L and 112R held by the yaw holding frames 18L and 18R will be freed to rotate in the yaw direction as well as in the pitch direction.

The reference numeral 23 denotes a yoke supporting member that supports a permanent magnet 27a and a yoke 27b that constitute the yaw direction drive mechanism 27, and is fastened onto the IS main body 19 with screws or the like.

The reference numeral 24 denotes a pitch direction detector that detects the rotating position (angle) of the pitch holding frame 20 and consists of the permanent magnet 24a and the hole device 24b.

The reference numeral 25 denotes a pitch direction drive mechanism that drives the pitch holding frame 20 around the pitch rotate pivot shaft 14 and is comprised of the permanent magnet 25a, the yoke 25b and the coil 25c. In this embodiment, the coil 25c and the coil supporting member 21 are provided on the other side of the rear groups 112L and 112R relative to the pitch rotate pivot shaft 14 in order to counterbalance the weights of the rear groups 112L and 112R.

The reference numeral 26 denotes a yaw direction detector that detects the rotating position (angle) of the yaw holding frame 18L and is comprised of the permanent magnet 26a and a hole device 26b.

The reference numeral 27 is a yaw direction drive mechanism that drives the yaw bridge 22, which is comprised of a permanent magnet 27a, a yoke 27b and a coil 27c.

Next, the electrical construction that controls the vibration correcting device will be described below. The vibration correcting device comprises vibration detectors that detect the amount of vibration of the binocular (instrument vibration) during observation, and a drive control circuit that drives and controls the rear groups 112L and 112R as the vibration-correcting optical system to control them based on the output signal from the vibration detectors so as to suppress the motions of the focused image formed by the object optical system and reduce the vibration of the image being observed. The vibration detectors are comprised of the pitch direction vibration sensor that detects the vibration in the pitch direction and the yaw direction vibration sensor that detects the vibration in the yaw direction.

The reference numeral 29 denotes a drive control circuit board that contains the vibration detectors and other control and drive circuits. The control circuit mounted on this drive control circuit board 29 includes a microcomputer or the like that drives the pitch direction drive mechanism 25 and the yaw direction drive mechanism 27 in the directions for canceling the image vibration due to the binocular vibration based on the detection signal of the vibration detector.

In order to activate the vibration correcting function, the observer (user) presses down an IS lock switch 30. Consequently, the protruding part 28a provided on the IS lock member 28 is pushed down and the switch (not shown) generates an electrical ON/OFF signal. When the observer presses down the IS lock switch 30 further, the IS lock member 28 releases the lock on the yaw bridge 22. In other words, the yaw holding frames 18L and 18R are now enabled to rotate in the pitch direction and the yaw direction, enabling the rear groups 112L and 112R to rotate both in the pitch direction and the yaw direction as well.

If any vibration occurs to the binocular due to shaky hands of the observer, the drive control circuit board 29 applies control voltages to the coils 25c and 27c, which constitute the pitch direction drive mechanism 25 and the yaw direction drive mechanism 27, based on the detected signal from the vibration detectors. The control voltages applied to the coils 25c and 27c are determined by calculations as the voltages necessary to rotate the rear groups 112L and 112R by the angles and directions required to cancel the image vibration.

Consequently, drive forces (magnetic forces) are generated on the coils 25c and 27c according to Fleming's rule and the pitch holding frame 20 and the yaw bridge 22 that hold the coils 25c and 27c move in the yaw and pitch directions. Thus, the rear groups 112L and 112R that are held by the yaw holding frames 18L and 18R rotate in the yaw and pitch directions to enable the observer to observe stable left and right images.

As shown in FIG. 3 and FIG. 5, a latching part (no reference numeral) is provided to latch the IS lock member 28 in the middle and to the right of the yaw bridge 22, so that yaw bridge 22 can be prevented from moving by latching the IS lock member 28 to the latching part. In other words, if the observer does not need the image vibration correction, the image vibration correcting operation is prevented by not pushing down the IS lock switch 30.

Next, detailed constructions of the ocular optical systems 13L and 13R of the binocular according to the present embodiment will be described. The reference numerals 31L and 31R denote ocular barrels holding the ocular optical systems 13L and 13R, respectively. The ocular barrels 31L and 31R have male helicoids 311L and 311R formed on their outside circumferences, and the male helicoids 311L and 311R mesh with female helicoids 321L and 321R formed on the inside circumferences of ocular holders 32L and 32R to be described later. Consequently, the ocular barrels 31L and 31R, i.e., ocular optical systems 13L and 13R are capable of moving back and forth along the optical axes 1L and 1R, respectively.

In this embodiment, the ocular barrel 31L is fixed on the ocular holder 32L by means of a fixing member (not shown), and the ocular barrel 31R moves back and forth for the purpose of dioptric adjustment.

The reference numerals 32L and 32R denote almost cylinder-shaped ocular holders having opening parts on the front and the rear ends. These rear side opening parts of the ocular holders 32L and 32R have fitting areas, into which the ocular barrels 31L and 31R are contained in fitted conditions respectively. The erecting prisms 12L and 12R are contained in the front opening parts of the ocular holders 32L and 32R.

Grease is applied to the aforementioned helicoids and the fitting areas provide appropriate rotational loads during dioptric adjustment.

The reference numerals 33L and 33R are prism bases made of a sheet metal of SUS (stainless steel), SPCC (cold rolled carbon steel) or the like, formed into quasi-fan shapes. The erecting prisms 12L and 12R are fixed on these prism bases 33L and 33R by glue or the like and positioned precisely in a predetermined position relation.

The reference numerals 34L and 34R are almost saucer-shaped prism holders having opening part (no reference numeral) on the front and the rear ends. The rear end opening parts of the prism holders 34L and 34R are provided for containing the prism bases 33L and 33R, on which the erecting prisms 12L and 12R are attached. Bases 341L and 341R of the holders are provided with positioning means and affixing means such as screws for fastening the prism bases 33L and 33R at a predetermined positions.

On the other hand, the front end opening parts of the prism holders 34L and 34R are provided for accepting rays entering the incident surfaces 121L and 121R of the erecting prisms 12L and 12R.

With such a construction as described above, a left and right pair of ocular units are formed by mounting the prism holders 34L and 34R to the opening parts of the ocular holders 32L and 32R into which the erecting prisms 12L and 12R are contained.

Next, the eyepiece width adjustment mechanism will be described. The ocular unit has a left and right pair of approximately symmetric shaped interlocking plates 36L and 36R as shown in FIG. 4 which rotate by a predetermined angle as they interlock with each other in the direction of the arrow shown in the drawing around the optical axes 1L and 1R of the objective optical system. In doing so, the space between the optical axes 1R' and 1L' of the ocular optical systems 13L and 13R widens or narrows, thus achieving the eyepiece width adjustment.

To be more specific, the interlocking plates 36L and 36R are placed in front of a holding plane 37a provided on an a L-shaped fixed base 37 to be described later, while the prism holders 34L and 34R are placed on the back of the holding plane 37a.

Flanges are formed on the front end of the prism holders 34L and 34R, respectively, for mounting the interlocking plates 36L and 36R. The interlocking plates 36L and 36R are positioned first on the flanges and then fastened using screws or the like.

The interlocking plates 36L and 36R have protrusions 361L and 361R protruding in the radial direction and gear parts 362L and 362R are formed on the ends thereof. By causing these sector gears 362L and 362R to mesh with each other in a proper phase relation, the left interlocking plate 36L and the right interlocking plate 36R interlock with each other, and thus this interlocking mechanism allows adjustment of the spacing between the optical axes of the two ocular optical systems.

On the outside periphery of the interlocking plates 36L and 36R are provided multiple bending parts 363L and 363R. These bending parts 363L and 363R make contact with the holding plane 37a of the fixed base 37 to cause an appropriate repelling force, thus providing a proper rotary load during the eyepiece width adjustment.

The focus adjusting mechanism will be described below referring to FIG. 3 and FIG. 5. The reference numeral 37 denotes a fixed base made of sheet metal of SUS (stainless steel), SPCC (cold rolled carbon steel) or the like, formed into an approximately L shape. The fixed base 37 has a holding plane 37a bent perpendicular to a horizontal plane containing the optical axes 1L and 1R and a horizontal part 37b parallel to the horizontal plane.

The top surface of the horizontal part 37b has four embossed areas for sliding, which are used for restriction of movement of a focus interlocking plate 38 (to be described later) in the perpendicular direction and serve as the sliding surfaces when the focus interlocking plate 38 moves in the optical axis direction.

The top surface of the horizontal part 37b also has mounting areas for mounting focus guides 39, which serve as guides when the focus interlocking plate 38 moves in the direction of the optical axes 1L and 1R as shown in FIG. 5.

The holding plane 37a has approximately cross-shaped opening parts 37c and 37d (only 37c is shown in FIG. 5) which center around the optical axes 1L and 1R. The openings 37c and 37d are both formed with a plurality of two sets of intermittent arcs centering around the optical axes 1L and 1R, wherein the intermittent arcs which have different radii, with smaller radius fits with the prism holder 34L and 34R to support them.

A rotation holding member 41 that rotatably holds a focusing dial 40 to be described later is fixed in the center of the upper portion of the holding plane 37a with three screws.

The reference numeral 38 is a focus interlocking plate made of sheet metal of SUS (stainless steel), SPCC (cold rolled carbon steel) or the like, formed into an approximately L shape similar to the fixed base 37. The focus interlocking plate 38 is comprised of a vertical part 38a bent perpendicular to the optical axes 1L and 1R and a horizontal part 38b parallel to those axes.

The horizontal part 38b has four sliding areas that slide against the four embossed areas of the fixed base 37 and four approximately rectangular opening parts 38c through 38f. The focus guides 39 and mounting seats provided on the IS main body 19 for mounting the focus interlocking plate 38 slides along the opening parts 38c through 38f.

The vertical part 38a has a rotation holding hole part 38g that rotatably holds a focusing screw 43 in the predetermined position when a nut 42 is screwed with the focusing screw 43.

The focusing dial 40 is provided at the rear end of the focusing screw 43, which also serves as a stop to prevent the focusing screw 43 from slipping off in the optical axis direction. The focusing screw 43 rotates at a fixed position relative to the fixed base 37 and the screw is screwed with the nut 42 fixed to the focus interlocking plate 38, so that the focus interlocking plate 38 can be moved back and forth along the optical axis direction relative to the fixed base 37 by turning the focus dial 40. The focus interlocking plate 38 is attached to the IS main body 19.

Constructed as abovementioned, focusing can be accomplished by turning the focusing dial 40 to move the IS main body 19, hence the yaw holding frames 18L and 18R that holds the vibration-correcting optical systems 112L and 112R, in the optical axis direction.

Although a case of connecting the yaw holding frames 18L and 18R with the yaw bridge 22 in front of the yaw rotate pivot shafts 15L and 15R is discussed above, it is also possible to connect the yaw holding frames 18L and 18R with the yaw bridge behind the yaw rotate pivot shafts 15L and 15R. Also, while the rear groups 112L and 112R are place on the opposite side of the pitch direction drive mechanism 25 across the first plane H1 in the former case (i.e., the present embodiment), it is possible to have the rear group 112L and 112R on the opposite side of the yaw direction drive mechanism or both the yaw direction drive mechanism and the pitch direction drive mechanism across the first plane H1 in the latter case.

Although a case of using the binocular vibration correcting device for a binocular is discussed in the above embodiment, the binocular vibration correcting device according to this invention can be applied to an optical instrument other than a binocular. For example, it can be applied to a stereoscopic shooting instrument by having the vibration-correcting optical system built into each of the left and right pair of objective optical systems that constitute a stereoscopic shooting optical system and taking left and right images to enable stereoscopic observations using such a stereoscopic shooting optical system.

According to the above embodiment, the left and right optical system holding members hold the vibration-correcting optical system are connected by a connecting member provided away from the yaw direction rotational axis in the optical axis direction, so that it is possible to correct image vibration by rotating the vibration-correcting optical system in both the yaw and pitch directions while securely maintaining the relative positions of the optical axes of the vibration-correcting optical system securely. More specifically, by forming a parallel link capable of operating in the yaw direction with the intermediate supporting member, a pair of optical system holding members and the connecting member, the parallel relation of the optical axes of the left and right vibration-correcting optical systems can be securely maintained.

Moreover, since the vibration-correcting drive for the left and right optical system holding members (i.e., the vibration-correcting optical system) is possible by driving the connecting member in the yaw direction with the yaw direction drive unit and the intermediate supporting member in the pitch direction with the pitch direction drive unit, the vibration correction can be accomplished with a simple construction, which provides an effective means of making the binocular optical instrument more compact.

Since the left and right vibration correcting optical systems can be each constructed of a single or multiple lenses, it provides a less expensive system compared to a case of using a variable apical angle prism.

What is claimed is:

1. A binocular vibration-correcting device comprising:
   left and right vibration-correcting optical systems that correct left and right image vibration by being driven in the yaw direction and the pitch direction in accordance with vibration;
   left and right optical system holding members that hold said left and right vibration-correcting optical systems, respectively;
   an intermediate supporting member that is a single member and supported by a main body member of said binoculars vibration-correcting device so as to be able to rotate in the pitch direction, the intermediate supporting member supporting said left and right optical system holding members so as to be able to rotate in the yaw directions;
   a connecting member that connects said left and right optical system holding members so as to be able to rotate in the yaw direction at a position away from the yaw direction rotational axes of said left and right optical system holding members in the direction of the optical axes;
   a yaw direction drive unit that drives said connecting member in the yaw direction; and
   a pitch direction drive unit that drives said intermediate supporting member in the pitch direction,
   wherein the yaw direction rotational axes of said left and right optical system holding members are distanced from said vibration-correcting optical systems in the direction of the optical axes.

2. The binocular vibration-correcting device according to claim 1, wherein
said left and right vibration-correcting optical systems each comprise a single optical component or multiple optical components.

3. The binocular vibration-correcting device according to claim 1, wherein said intermediate supporting member, said left and right of optical system holding members, and said connecting member constitute a parallel link that can operate in the yaw direction.

4. The binocular vibration-correcting device according to claim 1, wherein the yaw direction rotational axes of said left and right optical system holding members and the pitch direction rotational axis of said intermediate supporting member intersect each other perpendicularly in a same plane.

5. The binocular vibration-correcting device according to claim 1, further comprising:
a vibration detector that detects vibrations in the yaw direction and the pitch direction;
a position detector that detects a position of said connecting member in the yaw direction and a position of said intermediate support member in the pitch direction; and
a controller that controls said yaw direction drive unit and said pitch direction drive unit based on output signals from said vibration detector and said position detector.

6. The binocular vibration-correcting device according to claim 1, wherein the yaw direction rotational axes of said left and right optical system holding members and said pitch direction rotational axis of said intermediate supporting member intersect each other perpendicularly within a same plane, and
said left and right vibration-correcting optical systems are disposed on the opposite side of at least one of said yaw direction drive unit and said pitch direction drive unit across the plane.

7. A binocular optical instrument with a binoucular vibration-correcting device comprising:
left and right vibration-correcting optical systems that correct left and right image vibration by being driven in the yaw and pitch directions in accordance with vibration;
left and right optical system holding members that hold said left and right vibration-correcting optical systems, respectively;
an intermediate supporting member that is a single member and supported by a main body member of said binocular vibration-correcting device so as to be able to rotate in the pitch direction, the intermediate supporting member supporting said left and right optical holding members so as to be able to rotate in the yaw direction;
a connecting member that connects said left and right optical system holding members so as to be able to rotate in the yaw direction at a position away from the yaw direction rotational axes of said left and right optical system holding members in the direction of the optical axes;
a yaw direction drive unit that drives said connecting member in the yaw direction; and
a pitch direction drive unit that drives said intermediate supporting member in the pitch direction,
wherein the yaw direction rotational axes of said left and right optical system holding members are distanced from said correcting optical systems in the direction of the optical axes.

8. The binocular optical instrument according to claim 7, wherein said binocular optical instrument has left and right objective optical systems; and
said vibration-correcting optical systems are included in said left and right objective optical systems, respectively, and
said binocular optical instrument allows object observation through said left and right objective optical systems and a left and right pair of ocular optical systems.

9. The binocular optical instrument according to claim 7, wherein said left and right vibration-correcting optical systems are included, respectively, in left and right objective optical systems that constitute a stereoscopic shooting optical system, and
said binocular optical instrument allows stereoscopic shooting through said stereoscopic shooting optical system.

10. A binocular optical instrument with a binocular vibration-correcting device comprising:
left and right vibration-correcting optical systems that correct left and right image vibration by being driven in the yaw and pitch directions in accordance with vibration;
left and right optical system holding members that hold said left and right vibration-correcting optical systems, respectively;
an intermediate supporting member that is a single member and supported by a main body member of said binocular vibration-correcting device so as to be able to rotate in the pitch direction, the intermediate supporting member supporting said left and right optical holding members so as to be able to rotate in the yaw direction;
a connecting member that connects said left and right optical system holding members so as to be able to rotate in the yaw direction at a position away from the yaw direction rotational axes of said left and right optical system holding members in the direction of the optical axes;
a yaw direction drive unit that drives said connecting member in the yaw direction;
a pitch direction drive unit that drives said intermediate supporting member in the pitch direction;
a vibration detector that detects vibrations in the yaw direction and the pitch direction;
a position detector that detects a position of said connecting members in the yaw direction and a position of said intermediate support member in the pitch direction; and
a controller that controls said yaw direction drive unit and said pitch direction drive unit based on output signals from said vibration detector and said position detector,
wherein the yaw direction rotational axes of said left and right optical system holding members are distanced from said vibration-correcting optical systems in the direction of the optical axes.

11. The binocular optical instrument according to claim 10, wherein said binocular optical instrument has left and right objective optical systems; and
said vibration-correcting optical systems are included in said left and right objective optical systems, respectively, and
said binocular optical instrument allows object observation through said left and right objective optical systems and left and right ocular optical systems.

12. The binocular optical instrument according to claim 10, wherein said left and right vibration-correcting optical systems are included, respectively, in left and right objective optical systems that constitute a stereoscopic shooting optical system, and said binocular optical instrument allows stereoscopic shooting through said stereoscopic shooting optical system.

13. An observation optical instrument comprising:

a correcting optical system that corrects image vibration caused by vibration of said instrument;

a holding member that holds said correcting optical system;

a supporting member that is provided so as to be able to rotate in the pitch direction, said supporting member supporting said holding member so as to be able to rotate in the yaw direction;

a connecting member that is connected to said holding member, said connecting member being disposed at a position away from the yaw direction rotational axis of said holding member in the direction of the optical axis;

a pitch direction drive unit that drives said supporting member in the pitch direction; and a yaw direction drive unit that drives said connecting member in the yaw direction, wherein the yaw-directional axis of said holding member is distanced from said correcting optical system in the direction of the optical axis.

14. The observation optical instrument according to claim 13, further comprising:

a sensor that detects vibration of said instrument;

a detector that detects a moving position of said supporting member and a moving position of said connecting member; and a controller that controls said pitch direction drive unit and said yaw direction drive unit based on an output from said sensor and an output from said detector.

15. A vibration-correcting device comprising:

a first lens and a second lens located at a right side and a life side, respectively, a first holding member that holds said first lens;

a second holding member that holds said second lens;

a supporting member that supports said first holding member and said second holding member;

a body that supports said supporting member; and a connecting member that connects said first holding member with said second holding member at positions away from said supporting member, wherein said first holding member rotates in a yaw direction around a first axis with respect to said supporting member, said second holding member rotates in the yaw direction around a second axis with respect to said supporting member, said supporting member is rotatable in a pitch direction with respect to said body, and said first holding member and said second holding member rotate in the yaw direction with a movement of said connecting member.

16. A binocular telescope comprising:

an objective optical system including said vibration-correcting device according to claim 15;

an ocular optical system including a pair of lens units; and a pair of prisms, each being arranged between said objective optical system and said ocular optical system.

17. A vibration-correcting device comprising:

a first lens and a second lens located at a right side and a left side, respectively;

a first holding member that holds said first lens;

a second holding member that holds said second lens;

a supporting member that supports said first holding member and said second holding member;

a body that supports said supporting member; and a connecting member that connects said first holding member with said second holding member at positions away from said supporting member, wherein said first holding member rotates in a yaw direction around a first axis with respect to said supporting member, said second holding member rotates in the yaw direction around a second axis with respect to said supporting member, supporting member is rotatable in a pitch direction with respect to said body, and said connecting member connects said first and said second holding members so that said first and second holding members rotate in the yaw direction in a state in which optical axes of said first and second lenses maintain a parallel relationship.

18. A binocular telescope comprising:

an objective optical system including said vibration-correcting device according to claim 17;

an ocular optical system including a pair of lens units; and a pair of prisms, each being arranged between said objective optical system and said ocular optical system.

* * * * *

UNITED STATES PATENT AND TRADEMARK OFFICE
CERTIFICATE OF CORRECTION

PATENT NO. : 6,909,545 B2
DATED : June 21, 2005
INVENTOR(S) : Hironori Takano et al.

It is certified that error appears in the above-identified patent and that said Letters Patent is hereby corrected as shown below:

Column 1,
Line 33, "elusive" should read -- exclusive --; and
Line 45, "More over" should read -- Moreover, --.

Column 2,
Line 46, "rotate" should read -- rotational --; and
Line 47, "rotate" should read -- rotational --.

Column 6,
Line 2, "mechanisms" should read -- mechanism --.

Column 8,
Line 35, "an a" should read -- an --.

Column 9,
Line 53, "holds" should read -- hold --.

Column 10,
Line 13, "hold" should read -- that hold --; and
Line 50, "binoculars" should read -- binocular --.

Column 11,
Line 10, delete "of".

Signed and Sealed this

Thirteenth Day of June, 2006

JON W. DUDAS
*Director of the United States Patent and Trademark Office*